US012500908B2

(12) United States Patent
Park et al.

(10) Patent No.: US 12,500,908 B2
(45) Date of Patent: Dec. 16, 2025

(54) CYBER-SECURITY PRESENCE MONITORING AND ASSESSMENT

(71) Applicant: Allstate Insurance Company, Northbrook, IL (US)

(72) Inventors: Jason D. Park, Chicago, IL (US); Howard Hayes, Glencoe, IL (US); Tao Chen, Northbrook, IL (US); John S. Parkinson, Burlington, VT (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 18/738,764

(22) Filed: Jun. 10, 2024

(65) Prior Publication Data

US 2025/0007928 A1  Jan. 2, 2025

Related U.S. Application Data

(63) Continuation of application No. 17/163,723, filed on Feb. 1, 2021, now Pat. No. 12,010,123, which is a
(Continued)

(51) Int. Cl.
*G06F 21/55*  (2013.01)
*G06F 21/57*  (2013.01)
(Continued)

(52) U.S. Cl.
CPC .......... *H04L 63/1416* (2013.01); *G06F 21/55* (2013.01); *G06F 21/57* (2013.01);
(Continued)

(58) Field of Classification Search
CPC ............ H04L 63/1416; H04L 63/1425; H04L 63/1433; G06F 21/55; G06F 21/57;
(Continued)

(56) References Cited

U.S. PATENT DOCUMENTS 7,458,508 B1  12/2008  Shao et al.
9,077,747 B1   7/2015  Chen et al.
(Continued)

FOREIGN PATENT DOCUMENTS

CN  101242279    8/2008
CN  101243433 A  8/2008
(Continued)

OTHER PUBLICATIONS

Examination Report, CA 3023916, Sep. 12, 2019.
(Continued)

*Primary Examiner* — Paul E Callahan
(74) *Attorney, Agent, or Firm* — Akerman LLP

(57) ABSTRACT

Methods, computer-readable media, software, and apparatuses may monitor consumer information in order to determine a probability of a data breach associated with a customer based on an online presence of the customer. The probability of a data breach may be used to present metrics to a consumer and/or a service provider. Further, the consumer may be presented with information indicating what factors contribute to the probability of a data breach, as well as information regarding how to reduce those factors.

15 Claims, 7 Drawing Sheets

Related U.S. Application Data continuation of application No. 16/526,124, filed on Jul. 30, 2019, now Pat. No. 10,924,501, which is a continuation of application No. 15/150,955, filed on May 10, 2016, now Pat. No. 10,419,455.

(51) Int. Cl.
*G06F 21/62* (2013.01)
*H04L 9/40* (2022.01)

(52) U.S. Cl.
CPC ........ *G06F 21/577* (2013.01); *G06F 21/6245* (2013.01); *H04L 63/1425* (2013.01); *H04L 63/1433* (2013.01); *G06F 2221/2101* (2013.01)

(58) Field of Classification Search
CPC ............... G06F 21/577; G06F 21/6245; G06F 21/1425; G06F 2221/101
See application file for complete search history.

(56) References Cited

U.S. PATENT DOCUMENTS

| | | | |
|---|---|---|---|
| 9,294,498 B1* | 3/2016 | Yampolskiy | G06Q 10/06393 |
| 11,539,723 B2* | 12/2022 | Park | G06F 21/41 |
| 2004/0133564 A1 | 7/2004 | Gross et al. | |
| 2004/0162879 A1 | 8/2004 | Arcuri et al. | |
| 2004/0250115 A1 | 12/2004 | Gemmel et al. | |
| 2006/0226216 A1 | 10/2006 | Keithley et al. | |
| 2006/0272024 A1 | 11/2006 | Huang et al. | |
| 2007/0198662 A1 | 8/2007 | Parham et al. | |
| 2008/0091591 A1 | 4/2008 | Egnatios et al. | |
| 2008/0215488 A1 | 9/2008 | Jackman et al. | |
| 2009/0241173 A1 | 9/2009 | Troyansky | |
| 2009/0293125 A1 | 11/2009 | Szor | |
| 2011/0166988 A1 | 7/2011 | Coulter | |
| 2011/0204138 A1 | 8/2011 | Ukuda | |
| 2012/0210388 A1 | 8/2012 | Kolishchak | |
| 2012/0278216 A1 | 11/2012 | Evans et al. | |
| 2013/0013476 A1 | 1/2013 | Knafelz et al. | |
| 2013/0061179 A1 | 3/2013 | Alletto et al. | |
| 2013/0179360 A1 | 7/2013 | Baker et al. | |
| 2013/0238721 A1 | 9/2013 | Patel | |
| 2013/0246146 A1 | 9/2013 | Fischer et al. | |
| 2013/0268839 A1 | 10/2013 | Lefebvre et al. | |
| 2013/0298192 A1 | 11/2013 | Kumar et al. | |
| 2014/0115067 A1 | 4/2014 | Rosenwald | |
| 2014/0282977 A1 | 9/2014 | Madhu et al. | |
| 2015/0229664 A1 | 8/2015 | Hawthorn et al. | |
| 2015/0278907 A1 | 10/2015 | Nice et al. | |
| 2016/0028442 A1 | 1/2016 | Kernahan | |
| 2016/0044054 A1 | 2/2016 | Stiansen et al. | |
| 2016/0055594 A1 | 2/2016 | Emison | |
| 2016/0065594 A1 | 3/2016 | Srivaslava et al. | |
| 2016/0065614 A1 | 3/2016 | Stolfo et al. | |
| 2016/0071140 A1 | 3/2016 | Sherman | |
| 2016/0163186 A1 | 6/2016 | Davidson et al. | |
| 2016/0203575 A1 | 7/2016 | Madhu | |
| 2016/0226911 A1* | 8/2016 | Boss | H04L 63/1433 |
| 2016/0277424 A1* | 9/2016 | Mawji | G06Q 20/4016 |
| 2016/0308995 A1 | 10/2016 | Youdale et al. | |
| 2017/0085595 A1* | 3/2017 | Ng | G06Q 40/06 |
| 2019/0007441 A1 | 1/2019 | Kesin et al. | |
| 2020/0021607 A1 | 1/2020 | Muddu et al. | |
| 2020/0258164 A1 | 8/2020 | Denning | |

FOREIGN PATENT DOCUMENTS

| | | |
|---|---|---|
| CN | 102449648 | 5/2012 |
| CN | 102821137 | 12/2012 |
| CN | 103530565 | 1/2014 |
| CN | 104081375 A | 10/2014 |
| CN | 105323261 | 2/2016 |
| CN | 105528543 | 4/2016 |
| CN | 105940391 | 9/2016 |
| JP | 2004265400 | 9/2004 |
| JP | 2008181310 | 8/2008 |
| JP | 2011138236 | 7/2011 |
| JP | 2016504587 | 2/2016 |
| WO | 2007089786 | 8/2007 |
| WO | 2014100290 | 6/2014 |
| WO | 2015134008 | 9/2015 |
| WO | 2016028442 | 2/2016 |

OTHER PUBLICATIONS

Extended Search Report, EP 1786180.4, Apr. 24, 2020.
Dhinakaran et al., An Empirical Study of Spam and Spam Vulnerable Email Accounts, Future Generation Communication and Networking (FGCN 2007), vol. 1, pp. 408-413, 2007.
Fowdur et al., An Email Application with Active Spoof Monitoring and Control, 2016 Int'l Conf. on Computer Communication and Informatics (ICCCI), pp. 1-6, 2016.
Rahim et al., Analysis & compromising the loopholes of existing mail servers by providing an intelligent security measures, 2014 International Conference on Issues and Challenges in Intelligent Computing Techniques (ICICT), Ghaziabad, India, 2014, pp. 848-852.
International Search Report, PCT/US2017/031940, Sep. 5, 2017.
International Search Report, PCT/US2017/031940, Nov. 17, 2017.
Supplemental Search Report, EP 1779675.4, Sep. 25, 2019.
Examination Report, CA 30141289, May 11, 2020.
Search Report, EP 21200824.7, Jan. 17, 2022.
Examination Report, EP 1779675.4, Mar. 18, 2021.
Examination Report, CN 201780077939.X, Feb. 23, 2021.
Examination Report, CA 3041289, Feb. 9, 2021.
Examination Report, IN 201847045236, Feb. 23, 2021.

* cited by examiner

CYBER-SECURITY PRESENCE MONITORING AND ASSESSMENT

CROSS REFERENCE TO RELATED APPLICATIONS

This application is a continuation of U.S. application Ser. No. 17/163,723, filed Feb. 1, 2021, which is a continuation of U.S. application Ser. No. 16/526,124, filed Jul. 30, 2019, and issued as U.S. Pat. No. 10,924,501 on Feb. 16, 2021, which is a continuation of U.S. application Ser. No. 15/150,955, filed May 10, 2016, and issued as U.S. Pat. No. 10,419,455 on Sep. 17, 2019. The entire content of these applications is hereby incorporated by reference in its entirety.

FIELD OF ART

Aspects of the disclosure generally relate to methods and computer systems, including one or more computers particularly configured and/or executing computer software. More specifically, aspects of this disclosure relate to systems for capturing, evaluating, and communicating cyber-security data.

BACKGROUND

People and organizations may collect and/or analyze information, such as personal or confidential information of a user. Further, services, such as credit monitoring services or identity protection services, may monitor a user's account in order to determine if a data breach has occurred. As consumers continue to gain an ever-increasing presence in online environments, there will be an ever-present need to better protect consumers from confidential information being breached (e.g., made available publicly) in order to protect consumers from fraud and/or other harms.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, software, systems, and apparatuses for providing information relating to a risk of a data breach associated with a consumer. This may promote awareness regarding the risk of a data breach involving the consumer.

Aspects of this disclosure provide a cyber-security data processing system that may identify a consumer, monitor for the presence of confidential information associated with the consumer, and/or establish a value associated with the cyber-security risks associated with the consumer. The cyber-security data processing system may collect information from various networks, devices, and/or services. The cyber-security data processing system may then calculate a value based on a probability that the consumer may experience a data breach. In some instances, the information and/or value may be presented on a marketplace for consumption by service providers.

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

In accordance with various aspects of the disclosure, methods, computer-readable media, software, and apparatuses are disclosed for protecting consumers against data breaches. A consumer may be presented with a wide range of consumer risks, including cyber-extortion (e.g., ransomware), false/fraudulent account creation, credit card theft, credit score reduction, banking theft, and tax fraud. By monitoring and notifying a user of the potential for (or the occurrence of) data breaches, a system can diagnose vectors for data breaches, prevent future breaches, and/or provide recovery options if a breach occurs.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized, and structural and functional modifications may be made.

Figure 1:
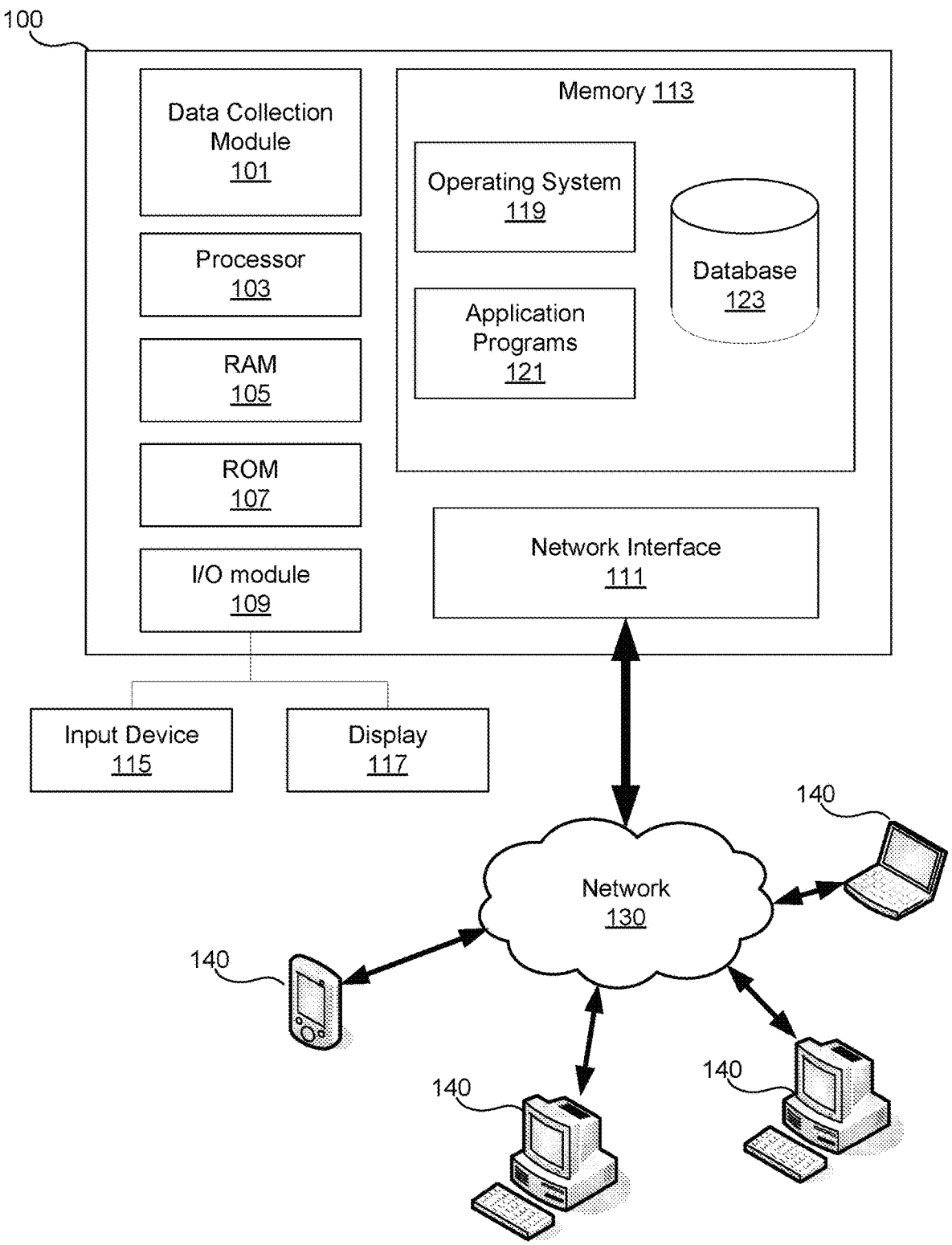
FIG. 1 illustrates an example security monitoring device or environment that may be used in accordance with one or more aspects described herein.

In one or more arrangements, aspects of the present disclosure may be implemented with a computing device. FIG. 1 illustrates a block diagram of an example security monitoring device 100 that may be used in accordance with aspects described herein. The security monitoring device 100 may be a computing device, such as a personal computer (e.g., a desktop computer), server, laptop computer, notebook, tablet, smartphone, vehicles, home management devices, home security devices, smart appliances, etc. The security monitoring device 100 may have a data collection module 101 for retrieving and/or analyzing data as described herein. The data collection module 101 may be implemented with one or more processors and one or more storage units (e.g., databases, RAM, ROM, and other computer-readable media), one or more application specific integrated circuits (ASICs), and/or other hardware components (e.g., resistors, capacitors, power sources, switches, multiplexers, transistors, inverters, etc.). Throughout this disclosure, the data collection module 101 may refer to the software and/or hardware used to implement the data collection module 101. In cases where the data collection module 101 includes one or more processors, such processors may be specially configured to perform the processes disclosed herein. Additionally, or alternatively, the data collection module 101 may include one or more processors configured to execute computer-executable instructions, which may be stored on a storage medium, to perform the processes disclosed herein. In some examples, the security monitoring device 100 may include one or more processors 103 in addition to, or instead of, the data collection module 101. The processor(s) 103 may be configured to operate in conjunction with data collection module 101. Both the data collection module 101 and the processor(s) 103 may be capable of controlling operations of the security monitoring device 100 and its associated components, including RAM 105, ROM 107, an input/output (I/O) module 109, a network interface 111, and memory 113. For example, the data collection module 101 and processor(s) 103 may each be configured to read/write computer-executable instructions and other values from/to the RAM 105, ROM 107, and memory 113.

The I/O module 109 may be configured to be connected to an input device 115, such as a microphone, keypad, keyboard, touchscreen, and/or stylus through which a user of the security monitoring device 100 may provide input data. The I/O module 109 may also be configured to be connected to a display device 117, such as a monitor, television, touchscreen, etc., and may include a graphics card. The display device 117 and input device 115 are shown as separate elements from the security monitoring device 100; however, they may be within the same structure. On some security monitoring devices 100, the input device 115 may be operated by users to interact with the data collection module 101, including providing user information and/or preferences, device information, account information, warning/suggestion messages, etc., as described in further detail below. System administrators may use the input device 115 to make updates to the data collection module 101, such as software updates. Meanwhile, the display device 117 may assist the system administrators and users to confirm/appreciate their inputs.

The memory 113 may be any computer-readable medium for storing computer-executable instructions (e.g., software). The instructions stored within memory 113 may enable the security monitoring device 100 to perform various functions. For example, memory 113 may store software used by the security monitoring device 100, such as an operating system 119 and application programs 121, and may include an associated database 123.

The network interface 111 allows the security monitoring device 100 to connect to and communicate with a network 130. The network 130 may be any type of network, including a local area network (LAN) and/or a wide area network (WAN), such as the Internet, a cellular network, or satellite network. Through the network 130, the security monitoring device 100 may communicate with one or more other computing devices 140, such as laptops, notebooks, smartphones, tablets, personal computers, servers, vehicles, home management devices, home security devices, smart appliances, etc. The computing devices 140 may also be configured in a similar manner as security monitoring device 100. In some embodiments the security monitoring device 100 may be connected to the computing devices 140 to form a "cloud" computing environment.

The network interface 111 may connect to the network 130 via communication lines, such as coaxial cable, fiber optic cable, etc., or wirelessly using a cellular backhaul or a wireless standard, such as IEEE 802.11, IEEE 802.15, IEEE 802.16, etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other computing devices 140.

The methods and software for capturing and communicating vehicle telematics data as disclosed herein may be implemented on one or more security monitoring devices 100 used in various network environments.

Figure 2:
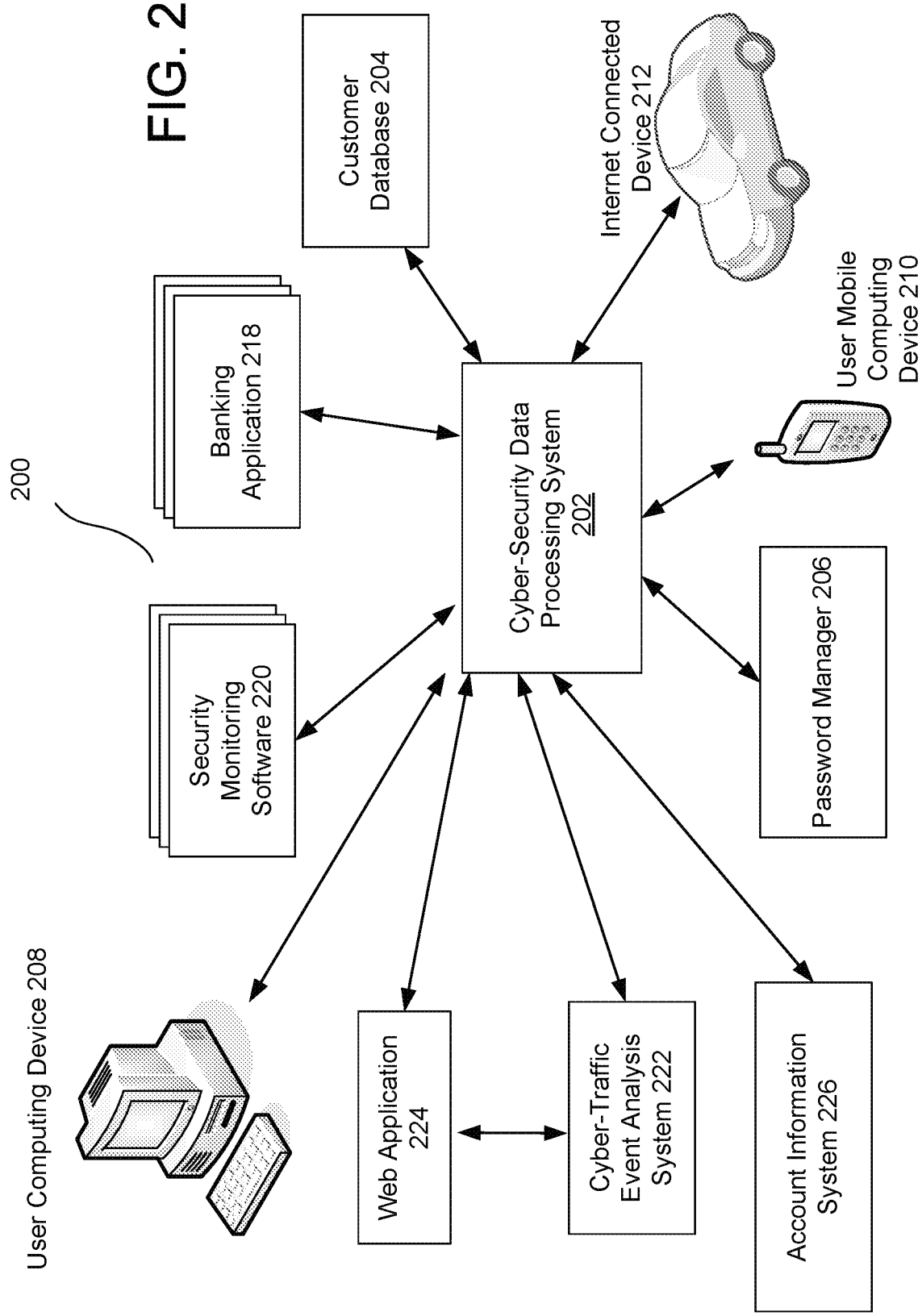
FIG. 2 illustrates an example system architecture for gathering and analyzing cyber-security data in accordance with one or more aspects described herein.

FIG. 2 illustrates a block diagram illustrating system architecture 200 for gathering and analyzing cyber-security data. The cyber-security data processing system (CSDPS) 202, which may also be referred to as the processing system 202 and/or the central processing system 202, may collect information from and transmit information to a consumer through various different channels such as a user mobile computing device 210, a user computing device 208, a password manager 206, banking application 218, and a web application 224. In some instances, the cyber-security data processing system 202 may be a data collection module 101 or a security monitoring device 100. The cyber-security data processing system 202 may receive user data for its consumers through channels such as customer database 204, internet connected device 212, account information system 226, and cyber-traffic event analysis system 222. The cyber-security data processing system 202 may communicate with one or more network-based accounts to detect information associated with a consumer account being communicated through a network.

In some embodiments, the cyber-security data processing system 202 may collect information from and transmit information to each of the various applications, databases, devices, and backend servers described in FIG. 2. The cyber-security data processing system 202 may collect information about consumers such as their real-time activity and interactions, predict the likelihood of a data breach, and determine strategies utilizing the various channels of communication with the consumer so as to determine how to best engage the consumer and protect the consumer from future threats. For example, the cyber-security data processing system 202 may collect information about a local network associated with a consumer based on receiving a network scan from the security monitoring software 220. The cyber-security data processing system 202 may analyze historic account information received from the account information system 226 to determine the likelihood of a data breach based on risk factors known for consumers with similar habits and/or characteristics. The cyber-security data processing system 202 may determine that the user may be engaging in particularly risky behavior, and may determine when to contact the consumer and through which channel to contact the consumer to inform the consumer of the potential for a data breach. The cyber-security data processing system 202 may enable a plurality of different permutations of strategies such as the above example by being able to sense real-time consumer actions and consumer-related data flow through various different channels. By analyzing data relevant to that consumer, the cyber-security data processing system 202 may inform various channels that it is communicatively coupled to regarding consumer-associated risks.

In some embodiments, the cyber-security data processing system 202 may communicate with a user (e.g., a consumer) and gather user data through banking application 218. The cyber-security data processing system 202 may collect user data from interactions of the user with the user interface of the banking mobile application 218. The banking application 218 may allow the user to manage account preferences, manage financial accounts, view recent transactions, and/or review suspicious behavior. The cyber-security data processing system 202 may track interactions with banking applications and/or receive notifications from the applications. For example, a notification regarding a recent suspicious banking transaction may be sent from a banking server to the banking application 218 and (either from the banking server or via the banking application 218) forwarded to the cyber-security data processing system 202. This may cause the cyber-security data processing system 202 to inform the consumer of the suspicious activity.

In some embodiments, a password manager 206 may assist the cyber-security data processing system 202 in determining the presence of consumer-associated accounts, and/or may assist the cyber-security data processing system 202 in determining the quality of credentials for the consumer-associated accounts. A risk-factor for a data breach may be a consumer who uses poor credentials (e.g., usernames, passwords, biometric information, etc.) for online accounts (e.g., weak passwords, using passwords for multiple accounts, a failure to use two-factor authentication, etc.). The password manager 206 may inform the cyber-security data processing system 202 of known accounts associated with the password manager 206, as well as the status of the credentials associated with those accounts. In some instances, the cyber-security data processing system 202 may compare the accounts known to the password manager 206 with other accounts known to the cyber-security data processing system 202 to determine what accounts are protected through password management.

In some embodiments, the customer may interact with the cyber-security data processing system 202 using the user computing device 208, web application 224, and/or user mobile computing device 210. The user may be able to view their current security status, see updates regarding security issues, seek remediation of those issues, and/or undergo further training regarding security practices. In some instances, if a data breach occurs, the consumer may be presented with an option to file an insurance claim for the security breach via the cyber-security data processing system 202 and/or through an associated application.

In some embodiments, the cyber traffic event analysis system 222 may monitor user activity on social media networks, the Internet in general, or the dark web (e.g., network-enabled websites with restricted addresses or accessibility such that the sites are not accessible using standard means, such as websites with no domain names that are hidden from online search engines). In some instances, the cyber-traffic event analysis system 222 may determine how much of a consumer's confidential (e.g., private) information is available electronically. Confidential information may comprise identity information such as name or birthday, marital status, family members, education, employment histories, online identities (e.g., user names on a social media account), financial information (e.g., banking numbers, credit card numbers, etc.), traceable assets (real estate, vehicles, etc.), court records, or other such information. By searching for electronically available information, the system may determine a "digital footprint" (e.g., a trail of data and information, available electronically and associated with the consumer). For example, the cyber-traffic event analysis system 222 may determine that a consumer's home address is available on 3 social media sites, 5 public web pages, and 2 dark web pages. The cyber-traffic event analysis system 222 may also search for instances where confidential information has become available. For example, the cyber-traffic event analysis system may further determine that one of the dark web pages has a credit card ending in "XXXX" associated with the consumer's address. The cyber-traffic event analysis system 222 may inform the cyber-security data processing system 202 of its findings, and the cyber-security data processing system 202 may act on those findings. For example, the cyber-security data processing system 202 may determine that the credit card number corresponds to the consumer, and push an alert to an application on the user's mobile computing device 210 notifying the user that their credit card number may have been breached.

In some embodiments, m addition to collecting user information from mobile applications and web applications, user information for consumers may be collected from various other channels such as user computing device 208, user mobile computing device 210, and internet connected device 212. The cyber-security data processing system 202 may determine devices associated with the consumer. The cyber-security data processing system may determine characteristics of those devices, such as their operating systems, update history, software on the devices, hardware characteristics, and so forth. The cyber-security data processing system 202 may use this information to determine if the number of devices and/or characteristics of the devices indicate a heightened threat of a data breach.

In some embodiments, the account information system 226 may maintain and dynamically update records of accounts for a consumer. For example, the account information system 226 may interface with social networking accounts associated with the consumer. If an account is breached (or if suspicious activity is detected), the cyber-security data processing system 202 may be notified. The cyber-security data processing system 202 may then notify the consumer, such as by sending an alert to a user computing device 208 and/or user mobile computing device 210.

Figure 3:
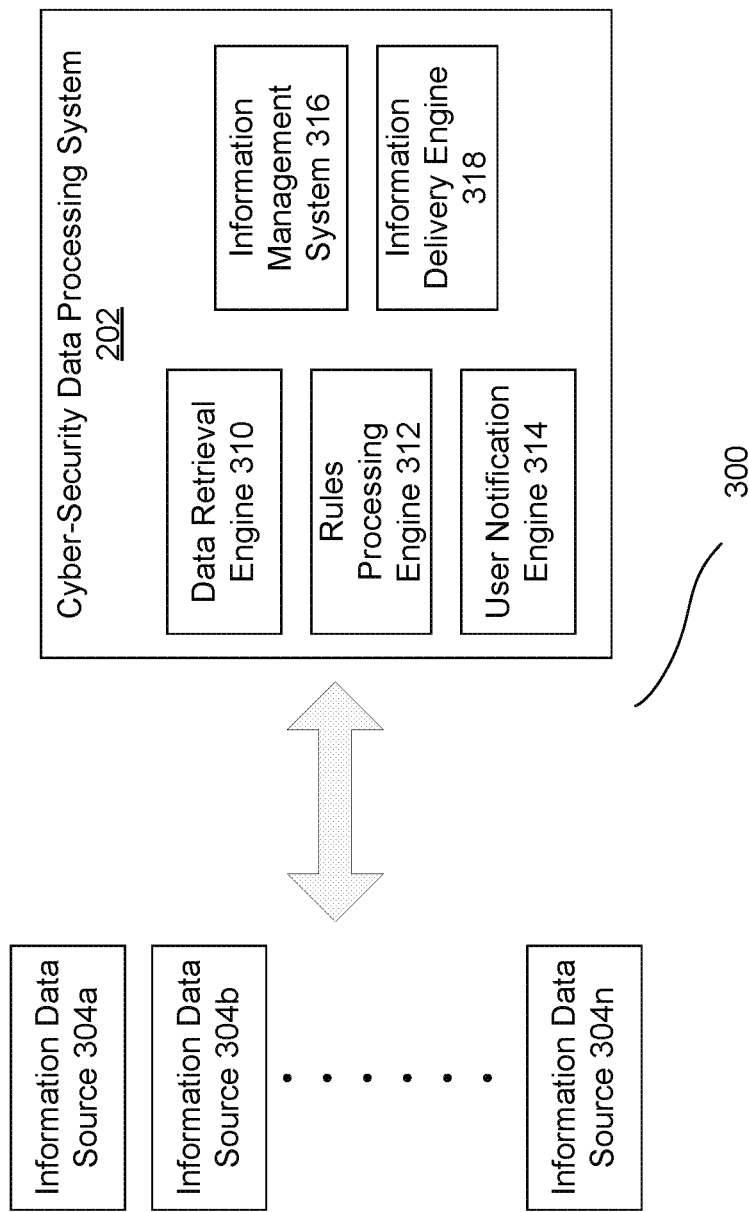
FIG. 3 illustrates an example system for collecting information from various information data sources to determine an online presence for a consumer in accordance with one or more aspects described herein.

FIG. 3 illustrates a block diagram 300 of a central processing unit that collects information from various information data sources to determine an online presence for a consumer (e.g., the spread of information or "footprint" left by a consumer in digital spaces). As shown in FIG. 3, the CSDPS 202 may communicate with a plurality of information data sources 304a, 304b, . . . 304n to collect information related to the consumer to determine next steps to best serve the consumer.

In some embodiments, the cyber-security data processing system 202 may retrieve information from the plurality of information data sources 304a-304n in order to determine the digital presence of a consumer. The data retrieval engine 310 may be configured to monitor (e.g., continuously monitor) each of the information data sources 304a-304n and report data of interest from any one of these data sources to the cyber-security data processing system 202. For example, the data retrieval engine 310 may monitor social media sources to determine if account information associated with the consumer is detected. If the information is detected, it may be passed on to the cyber-security data processing system 202 for analysis. In another example, the data retrieval engine 310 may interface with one or more digital accounts (banking accounts, social media accounts, digital storefronts, etc.) to determine if accounts are created, active, and/or in use. Account information may be passed on to the cyber-security data processing system 202.

In some embodiments, the cyber-security data processing system 202 may calculate risk based on the data gathered from the information data sources 304a-304n. For example, the insurance rules processing engine 312 may analyze the data retrieved from information data sources 304a-304n by the data retrieval engine 310 according to preset rules and/or algorithms in order to determine the likelihood of a data breach based on the digital presence of the consumer.

In some embodiments, the cyber-security data processing system 202 may determine when and through which means to notify an insurance consumer of the risks of a data breach and/or evidence of a data breach according to preset rules and strategies calculated from the data gathered from the information data sources 304a-n. For example, the user notification engine 314 may determine a time to contact the consumer with a message and/or notification generated by the cyber-security data processing system 202 upon analyzing the activities of the consumer and processing such activities according to risk matrices maintained by cyber-security data processing system 202.

In some embodiments, the cyber-security data processing system 202 may manage the various activities of each consumer, and the status of various accounts associated with the consumer. For example, the information management system 316 may keep track of all of the information received from information data sources 304a-304n and may also manage a schedule of message delivery by communicating with the user notification engine 314. In another example, the cyber-security data processing system 202 may notify the user whenever an account is accessed at an unexpected time and/or from an unexpected location.

In some embodiments, the cyber-security data processing system 202 may determine which channel to use to communicate the decision of a strategy computed at the cyber-security data processing system 202. For example, the information delivery engine 318 may detect which mobile application accessible to the user is the most appropriate channel on which to deliver the type of information that is scheduled to be delivered to the insurance consumer and/or other target audience.

Figure 4:
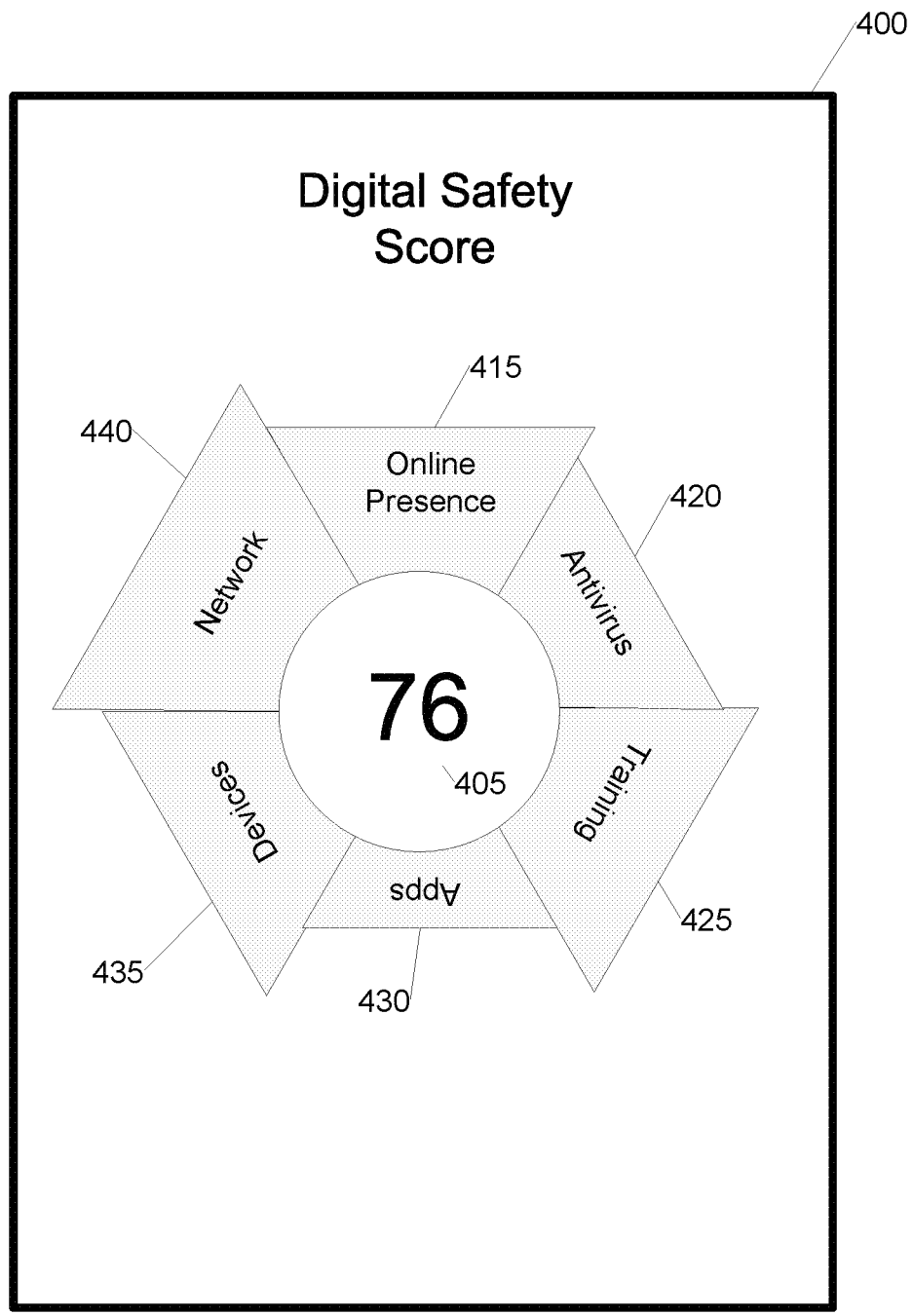
FIG. 4 illustrates an example user interface displaying an example rating screen m accordance with one or more aspects described herein.

FIG. 4 illustrates a user interface 400 displaying an example rating screen for a digital safety score 405. In some examples, these user interfaces may be generated by an application server, web application 224, user computing device 208, and/or user mobile computing device 210. It should be understood that the user interface of FIG. 4 is designed to illustrate various features and aspects of the user interfaces and the system, and do not limit the visual appearance or layout of the user interfaces. The mobile computing device 210 may be a smartphone, and the user interface 400 may be part of a smartphone app. A shortcut may be presented on a home screen (or desktop screen) of an operating system executing the user interface 400.

A digital safety score 405 may be a rating and/or representation of different components which contribute to the risk of a data breach of an associated consumer. The digital safety score 405 may be a numeric value that indicates the risk of a data breach. While the description herein assumes a higher score reflects a lower chance of a data breach, any algorithm for determining the value may be used. For example, the digital safety score 405 may comprise a value from 0 to 200, where an algorithm determines the value such that a higher value indicates a lower risk of a data breach. In some instances, a lower number may indicate lower risk. For example, a value from 0 to 100 may be assigned, wherein the value approximates the chance of a significant data breach within the next year.

The components depicted in user interface 400 are merely exemplary components, and any number of components that affect the possibility of a data breach may be used. The components may be represented with shapes that correspond to their strength and/or impact. For example, triangles or wedges may be sized in proportion to their impact versus other components (e.g., larger shapes correspond to a larger impact than smaller shapes). In another example, shapes may vary in size based on the risk associated with each item (e.g., a larger shape may indicate an area with higher associated risk). In some instances, a shaded ring or pie graph may be divided into different proportional sections for each component that contributes to the risk of a data breach. In some instances, a combination of the above may be used. For example, the width of wedges may indicate the proportion of the score, while the height may indicate whether the component has a positive or negative impact, and a ring around the wedges may indicate the proportion of a maximum score achieved.

A number of exemplary components are depicted in FIG. 4. An online presence component 415 may indicate the online presence of a consumer. For example, a consumer may have 48 different accounts detected across a range of Internet services. The CSDPS 202 may determine that the relatively high number of accounts increases the potential risk of a data breach. Accounts may be judged based on the type of account. For example, a large number of banking accounts may greatly increase the risk of a significant data breach, because a breach may result in important financial data being compromised. In another example, a large number of website accounts comprising only a username and password (such as accounts on a cookbook website, a news website, a sports website, etc.) may be weighted less than a smaller number of banking accounts, because the impact of a data breach to the consumer may be minimal compared to the impact of a breach regarding banking information. In some instances, the usage of usernames and/or passwords may be tracked and used to determine a component of the digital safety score 405. For example, a password manager may report that three passwords are used across 48 accounts. This may greatly increase the danger of a data breach, as a breach of a password across one account may affect a large number of other accounts. In some instances, this may increase the probability of a data breach, which may be reflected in the rating.

Some components may monitor devices and/or environments associated with a consumer. A network component 440 may indicate the quality of networking security associated with a consumer. The CSDPS 202 may receive information indicating the types of devices on a network (e.g., switches, routers, etc.), the configurations of the devices (e.g., encryption methods used, wireless vs. wired connections, software updates installed, credentials required for access, etc.), and/or how many devices are connected. For example, the CSDPS 202 may communicate with a home network associated with the consumer to determine that the consumer has a wireless router with a non-default administrative password, a WPA2 encrypted SSID that is not broadcast, two connected wireless devices, and a connected wired device. The CSDPS 202 may determine a rating based on the strength of the network and/or the potential for the network to be breached. An antivirus component 420 may indicate the health of one or more devices associated with the consumer. An antivirus may decrease the probability of a data breach by protecting software and/or hardware from malicious intrusions. The digital safety score 405 may thus be increased for every device with an installed antivirus, and may be lowered if a problem is detected. A devices component 435 may indicate risks associated with the number of and/or quality of devices associated with a consumer. A consumer may be more at risk for a data breach if more devices with access to consumer accounts exist. For example, the CSDPS 202 may determine that an old, forgotten tablet with an outdated operating system is associated with the user. The tablet may present an intrusion point due to unpatched vulnerabilities. Thus, the tablet may reduce the digital safety score 405.

An applications component 430 may also impact the digital safety score 405. The CSDPS 202 may receive information from one or more connected services. For example, a credit monitoring service may report fraudulent activity on a credit card, which may decrease the digital safety score. In another example, a consumer identify protection service may provide information on whether any breaches have been detected by their service, which may affect the score.

A training component 425 may adjust the digital safety score 405 based on training conducted by the consumer. A consumer may be able to watch training videos, read articles, take quizzes, or listen to audio regarding cyber-security. For example, the user may be able to interact with the displayed training component to see options for training. If the user engages in training items, the user may be rewarded through an increased digital safety score. This may help encourage the user to stay informed regarding best practices for cyber-security.

Figure 5:
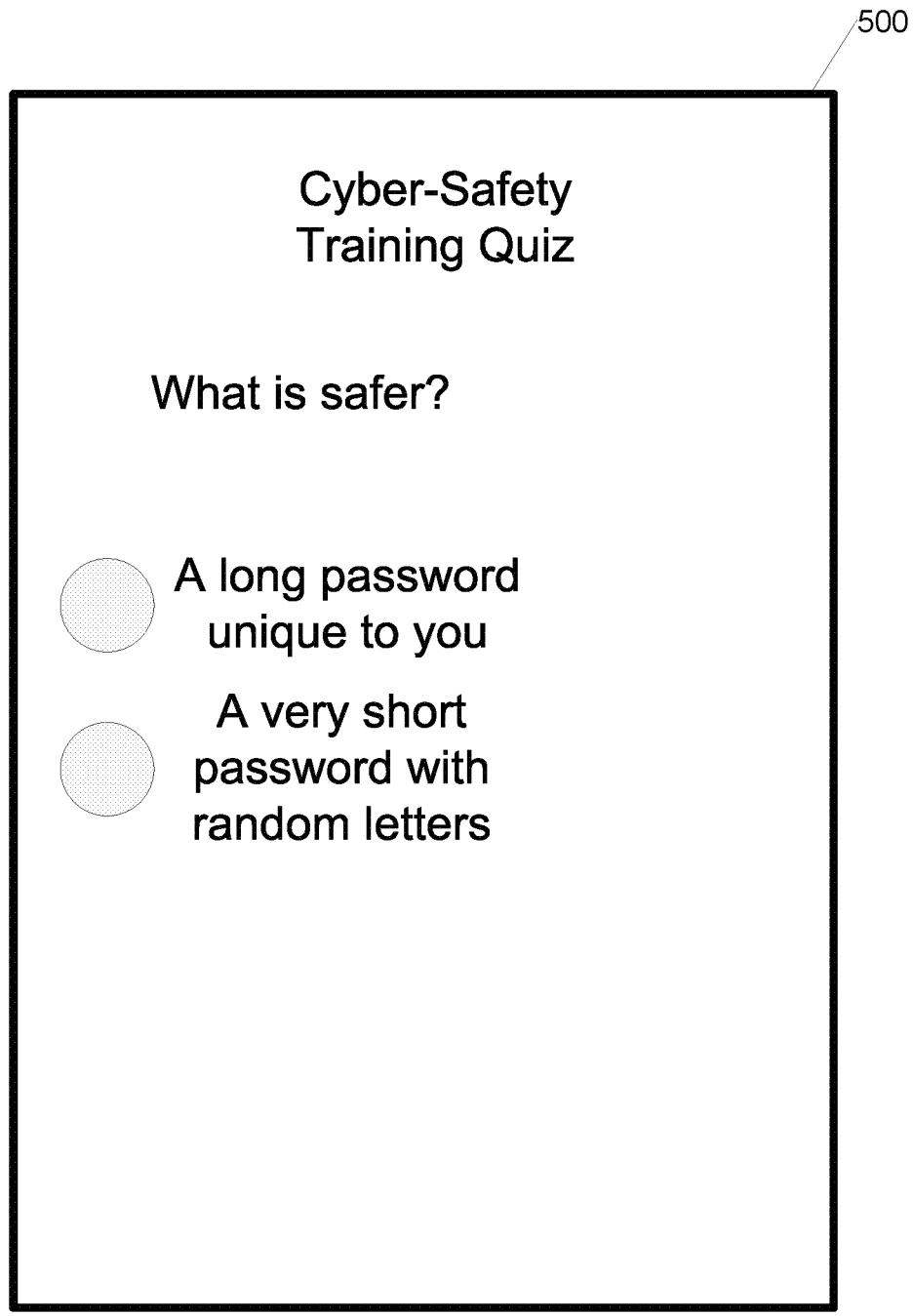
FIG. 5 illustrates an example training quiz in accordance with one or more aspects described herein.

FIG. 5 depicts an exemplary training quiz 500 in accordance with one or more aspects described herein. In some instances, the user may first receive instructional content (such as watching a video with information related to cyber-security, do's and don'ts, and the like). The user may be presented with a quiz regarding safety features discussed in the video or other instructional content. The user may be rewarded if they answer the questions correctly (as this may indicate that the user understood the content and/or knows how to practice good cyber-security).

Figure 6:
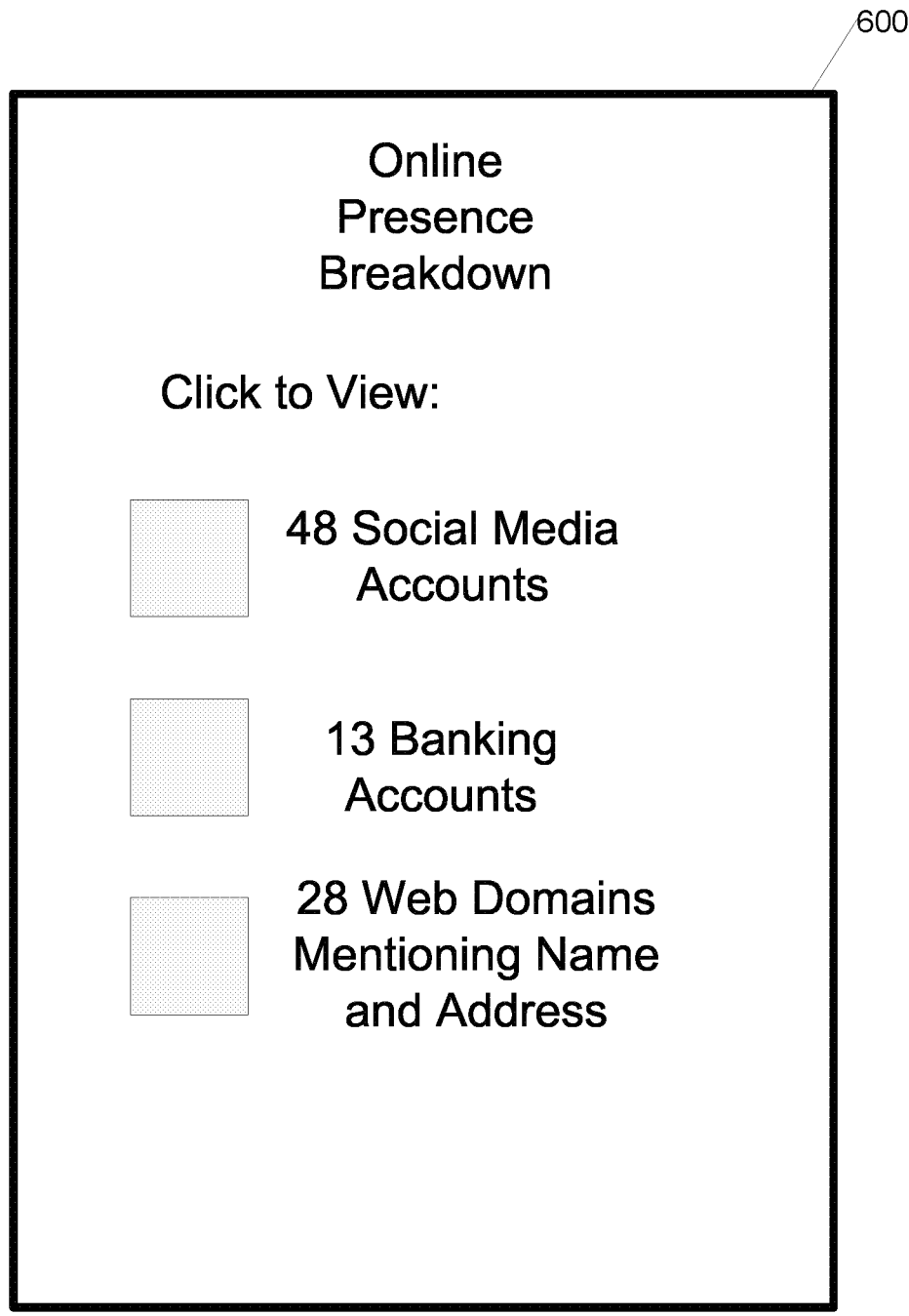
FIG. 6 illustrates an example breakdown screen for a component in accordance with one or more aspects described herein.

FIG. 6 depicts an exemplary breakdown screen for a component in accordance with one or more aspects described herein. In some instances, the user may be able to examine the various components of the digital safety score 405. Breakdowns of the various data items that contribute to each component may be available for the consumer to view, along with notifications and/or suggestions for improvement. For example, the online presence component 415 may be accessed to present an online presence breakdown screen 600, as depicted in FIG. 6. The online presence breakdown screen 600 may provide the consumer with a listing of accounts associated with the consumer or data on the Internet detected by the cyber-traffic event analysis system 222. In some instances, this listing may provide a listing of registered accounts according to the name of the account (e.g., name of cable company, bank, etc.). For example, the consumer may be able to view a list of known Internet accounts, and discover that the consumer has numerous online accounts which the consumer was unaware of. In another example, the consumer may discover that the home address of the consumer is readily available on a web-page. In some instances, the listing may identify accounts associated with credit card use, recurring payments, frequent use, the storage of personal and/or confidential information, and/or other such characteristics.

In some instances, accounts may be centrally consolidated and/or cancelled. Accounts may be consolidated in the listing, such as by providing a centralized login for multiple accounts. For example, a service provider associated with the CSDPS 202 may provide a centralized login screen with a consolidated username and password. A consumer may select accounts from the listing of detected accounts with which to use the centralized login screen. The consumer may also select unwanted accounts from the listing for cancellation. In some instances, the CSDPS 202 may direct the consumer to a web page associated with each account for cancelling each account. In other instances, the CSDPS 202 may process the selections by coordinating with one or more services to cancel accounts. This may have the advantage of reducing the digital footprint for a consumer by reducing the number of active accounts.

Figure 7:
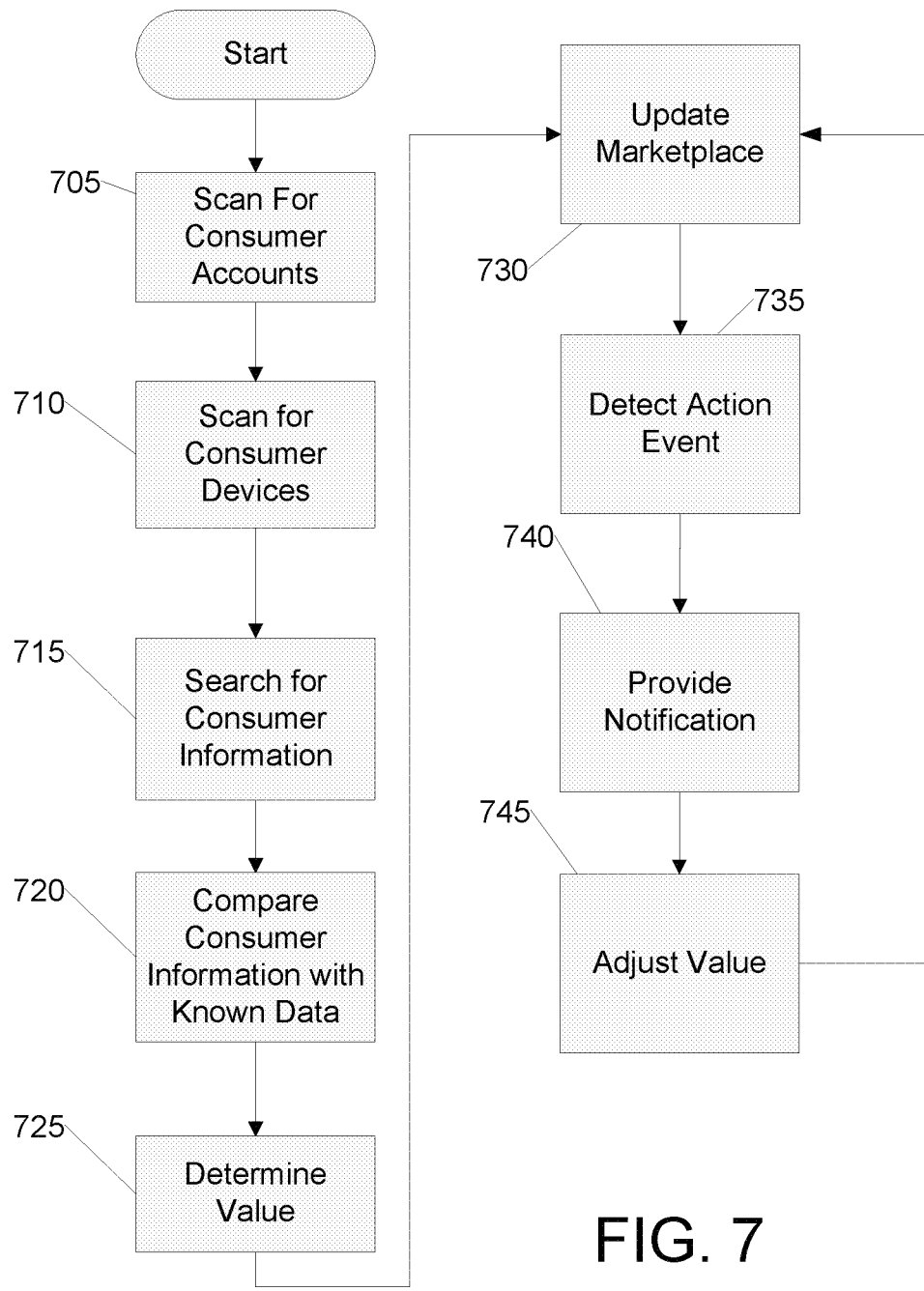
FIG. 7 illustrates an example method for determining a value associated with a potential for data breach of a consumer's data in accordance with one or more aspects described herein.

FIG. 7 depicts a method for determining a value associated with a potential for data breach of a consumer's data. The value (e.g., a digital safety score) may present a consumer or marketplace consumer with a readily identifiable value corresponding to the risk of a data breach involving a consumer.

At step 705, the CSDPS 202 may initiate a scan for consumer accounts. The CSDPS 202 may request login information from the consumer. Accounts may be determined according to one or more methods. For example, the consumer may supply the CSDPS with identifying information, such as a name, date of birth, address, social security number, or other such information. The CSDPS may integrate with one or more services (such as social media websites, banking websites, etc.) which may inform the CSDPS 202 whether the identifying information corresponds to an account on each service. In another example, the consumer may register to receive a digital safety score. As part of the registration, the consumer may be presented with a list of accounts, and may be asked to give credentials for the accounts. In yet another example, the consumer may supply the CSDPS 202 with access to an aggregation service, such as a password manager, which may identify known accounts and/or credentials for each account. Some accounts, such as accounts with a credit monitoring service and/or identity protection service, may supply data indicating risk. In some instances, the CSDPS 202 may find account data across numerous services and bring the data from all the services together so that it may bind the data into a value in step 725.

At step 710, the CSDPS 202 may scan for devices associated with the consumer. The CSDPS 202 may identify devices on a network associated with the consumer and/or devices associated with the consumer's credentials. For example, the CSDPS 202 may initiate a network scan which may identify devices along a network and information corresponding to each device (e.g., device type, model numbers, operating systems, software versions, applications installed on the devices, network capabilities, etc.).

At step 715, the CSDPS 202 may search for digitally-available information associated with the consumer (e.g., an online presence associated with the consumer). The CSDPS 202 may initiate a scan for digitally-available information, such as by instructing the cyber-traffic event analysis system 222 to scan for consumer information (addresses, credit card numbers, credentials, social security numbers, etc.) that correspond to the consumer. In some instances, the cyber-traffic event analysis system may continually compile consumer data based on data found on the Internet. For example, the cyber-traffic event analysis system may monitor dark web pages for credit card numbers, addresses, phone numbers, etc. The CSDPS 202 may also collect activity data associated with the consumer. For example, the CSDPS 202 may track how often, on what devices, and/or where a consumer conducts banking transactions. A consumer may be penalized if the consumer conducts banking on a train, where other individuals may be able to more easily view the consumer's confidential banking information.

At step 720, the CSDPS 202 may compare the consumer information with data known to correspond to the consumer. In some instances, the CSDPS 202 may determine if data compiled by the cyber-traffic event analysis system matches data associated with the consumer. For example, the CSDPS 202 may determine if a credit card number previously found on a dark web page and stored in a database of detected credit card numbers matches a credit card number entered by the consumer.

At step 725, the CSDPS 202 may determine a value associated with the consumer. The CSDPS 202 may use one or more algorithms to determine a value based on consumer accounts, consumer devices, online presence data, or other collected information. The CSDPS 202 may compare the compiled data against risk matrices to determine the likelihood of a data breach based on the collected data. For example, a user with a large number of devices and accounts may have a high probability of a data breach and be assigned a low value.

At step 730, the CSDPS 202 may update a marketplace with the value. Risk information (e.g., a value and/or the information from which the value is derived) may be a valuable tool for determining the risk of a data breach associated with a consumer. For example, the value may indicate that there is a 20% chance that a consumer will fall victim to credit card fraud within the next six months.

A marketplace may be established for buying and selling risk information. For instance, an insurance marketplace may allow insurance providers to access risk information from the CSDPS 202. Insurance providers and/or underwriters may establish cyber-fraud insurance policies based on the risk information. For example, an insurance provider may offer an insurance policy to the consumer that protects against fraudulent transactions based on the risk information. If a consumer incurs financial damage as a result of a data breach (for example, the consumer is subjected to credit card fraud), the insurance policy may compensate the consumer for some or all financial losses incurred.

Premiums and/or deductibles for insurance policies may be established based on the risk information and/or value associated with a potential for data breach of a consumer's data. For example, a consumer with a high value may be charged a higher premium than a consumer with a low value.

In some instances, the risk information may be collected and used to determine behavioral patterns for a class of consumer. Over time, the CSDPS 202 may determine the behavioral patterns based on detecting associations between different data points known to the CSDPS 202. For example, the CSDPS 202 may determine that individuals with more than two credit card numbers detected on the Internet have a 65% chance of credit card fraud, while individuals with two or less credit card numbers detected on the Internet have a 38% chance of credit card fraud. The CSDPS 202 may continually iterate on this information to determine more and/or more accurate associations and/or patterns. For example, using data collected over time, the CSDPS 202 may determine that individuals with at least 5 active social networking accounts have a 15% greater chance of suffering from tax fraud than individuals with less than 5 active social networking accounts. Thus, the CSDPS 202 may determine an increased chance of tax fraud when a consumer registers a fifth social networking account (and, in some instances, provide a notification to a user and/or service provider after the fifth social networking account is registered).

In some instances, the determined, resultant behavioral data representing the behavioral patterns and/or the data used to determine behavioral patterns may be made available through the marketplace. A database of patterns may be made available detailing the risks associated with given behaviors (e.g., the risk of a data breach based on a given digital footprint). An insurer may pay to have access to a marketplace of the data in order to better tailor insurance products for a consumer based on associated risk. For example, the insurer may increase premiums for all customers by 7% because the data used to determine behavioral patterns indicates an overall 7% increase in cyber-crime in the past 18 months. In some instances, a governmental entity, such as law enforcement, may subscribe to the marketplace in order to determine how best to predict, identify, and/or react to cyber-crime. Data may also be used for advertising purposes. An advertiser may use the data to associate online activity with demographic information for targeted advertising. For example, an advertiser may determine a demographic of consumers aged 20-28 with at least 6 social networking accounts in order to conduct a targeted advertising campaign for a new social network. In another example, a post-card company may determine a list of consumers with no social networking accounts for mailing an advertisement comprising a selection of post-cards.

In some instances, access to the marketplace may be restricted and/or incur a fee. For example, a fee may be charged to access risk information collected by the CSDPS 202. In some instances, the CSDPS 202 may collect information from a variety of sources (e.g., credit monitoring services, identity theft protection services, consumer information protection services, etc.), and store the combined information in a database. In some instances, a separate fee may be charged for access to only a subset of the database information.

At step 735, the CSDPS 202 may determine if an action event has been detected. An action event may comprise a detected change in a consumer account and/or detection of a data breach. For example, the cyber-traffic event monitoring system 222 may detect that a credit card number associated with a consumer with a known value has been published on a website.

In some instances, an action event may be an action taken by the consumer. A consumer may register a new account online, open up a new financial service account, start using a password manager, connect a new device, or undergo cyber-security training. As a result of the action, the CSDPS 202 may wish to adjust the value. For example, by adding additional accounts online, the consumer may be more susceptible to a data breach and the value may be lowered. In another example, the consumer may perform cyber-security training, and may be rewarded with a higher value.

At step 740, The CSDPS 202 may notify the consumer of the action event. To reduce the impact of a data breach, it may be advantageous to notify the consumer and/or services associated with the data breach. For example, the CSDPS 202 may trigger a notification to appear on a user mobile computing device 210 indicating that credentials have been leaked for an account. In another example, the CSDPS 202 may notify a credit card company that a credit card number for the consumer was detected on the dark web. The consumer and/or service provider may then take action to reduce any potential damage resulting from the data breach.

At step 745, the CSDPS 202 may adjust the value. Information indicating if a breach is more or less likely to occur may affect a value. In some instances, an actual data breach may indicate that a breach is more likely to occur in the future, lowering the value. For example, if a data breach has occurred, the value may be lowered. In another example, a value may be raised when a user deletes old social media accounts that the consumer no longer uses. In yet another example, a value may be raised when a user enacts stronger privacy policies on accounts, such as social media accounts. After adjusting the value, the CSDPS 202 may return to step 730 to update the marketplace with the new risk information.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

The invention claimed is:

1. A cyber-security system, comprising:
one or more processors;
a memory unit storing computer-executable instructions, which when executed by the one or more processors, cause the cyber-security system to:
monitor a plurality of digital accounts associated with a consumer on a communications network, wherein the plurality of digital accounts comprises (i) one or more digital financial accounts with one or more financial institutions; (ii) one or more digital social media accounts with one or more social media networks; and (iii) one or more digital website accounts comprising only a username and password;
determine, based on the monitoring, a value associated with a cyber-security risk associated with the consumer, wherein the value associated with the cyber-security risk is determined based on (i) a number of the one or more digital financial accounts that the consumer is associated with, and a first weight for the number of the one or more digital financial accounts; (ii) a number of the one or more social media accounts that the consumer is associated with, and a second weight for the number of the one or more social media accounts; and (iii) a number of the one or more digital website accounts that the consumer is associated with, and a third weight for the number of the one or more digital website accounts, wherein each of the first weight, the second weight, and the third weight is different from each other; and
after subsequently determining, based on the monitoring, that the plurality of digital accounts associated with the consumer has decreased, decrease the value associated with the cyber-security risk associated with the consumer.

2. The cyber-security system of claim 1, wherein the first weight for the number of the one or more digital financial accounts is higher than the third weight for the number of the one or more digital website accounts.

3. The cyber-security system of claim 1, wherein the instructions, when executed by the one or more processors, cause the cyber-security system to:
detect that a credit card number associated with the consumer has been published on a website.

4. The cyber-security system of claim 1, wherein the instructions, when executed by the one or more processors, cause the cyber-security system to:
detect an occurrence of a fraudulent transaction associated with a banking account of the consumer.

5. The cyber-security system of claim 1, wherein the instructions, when executed by the one or more processors, cause the cyber-security system to:
after decreasing the value associated with the cyber-security risk associated with the consumer, decrease an insurance premium of an insurance product associated with the consumer.

6. The cyber-security system of claim 1, wherein the instructions, when executed by the one or more processors, cause the cyber-security system to:
monitor consumer activities associated with the plurality of digital accounts on an internet comprising a social media network and a dark web.

7. The cyber-security system of claim 1, wherein the instructions, when executed by the one or more processors, cause the cyber-security system to:
provide, for display to the consumer, a list of the plurality of digital accounts associated with the consumer; and
following a determination that the consumer has selected to cancel a first digital account of the plurality of digital accounts associated with the consumer, provide, for display to the consumer, a direction to a web page associated with the first digital account that allows for cancelling the first digital account.

8. A computer-implemented method comprising:
monitoring a plurality of digital accounts associated with a consumer on a communications network, wherein the plurality of digital accounts comprises (i) one or more digital financial accounts with one or more financial institutions; (ii) one or more digital social media accounts with one or more social media networks; and (iii) one or more digital website accounts comprising only a username and password;
determining, based on the monitoring, a value associated with a cyber-security risk associated with the consumer, wherein the value associated with the cyber-security risk is determined based on (i) a number of the one or more digital financial accounts that the consumer is associated with, and a first weight for the number of the one or more digital financial accounts; (ii) a number of the one or more social media accounts that the consumer is associated with, and a second weight for the number of the one or more social media accounts; and (iii) a number of the one or more digital website accounts that the consumer is associated with, and a third weight for the number of the one or more digital website accounts, wherein each of the first weight, the second weight, and the third weight is different from each other; and
after subsequently determining, based on the monitoring, that the plurality of digital accounts associated with the consumer has decreased, decreasing the value associated the cyber-security risk associated with the consumer.

9. The computer-implemented method of claim 8, wherein the first weight for the number of the one or more digital financial accounts is higher than the third weight for the number of the one or more digital website accounts.

10. The computer-implemented method of claim 8, further comprising:
   detecting that a credit card number associated with the consumer has been published on a website.

11. The computer-implemented method of claim 8, further comprising:
   detecting an occurrence of a fraudulent transaction associated with a banking account of the consumer.

12. The computer-implemented method of claim 8, further comprising:
   after decreasing the value associated with the cyber-security risk associated with the consumer, decreasing an insurance premium of an insurance product associated with the consumer.

13. The computer-implemented method of claim 8, further comprising:
   monitoring consumer activities associated with the plurality of digital accounts on an internet comprising a social media network and a dark web.

14. A non-transitory computer-readable storage medium having computer-executable program instructions stored thereon that when executed by a processor of a computing system causes the computing system to:
   monitor a plurality of digital accounts associated with a consumer on a communications network, wherein the plurality of digital accounts comprises (i) one or more digital financial accounts with one or more financial institutions; (ii) one or more digital social media accounts with one or more social media networks; and (iii) one or more digital website accounts comprising only a username and password;
   determine, based on the monitoring, a value associated with a cyber-security risk associated with the consumer, wherein the value associated with the cyber-security risk is determined based on (i) a number of the one or more digital financial accounts that the consumer is associated with, and a first weight for the number of the one or more digital financial accounts; (ii) a number of the one or more social media accounts that the consumer is associated with, and a second weight for the number of the one or more social media accounts; and (iii) a number of the one or more digital website accounts that the consumer is associated with, and a third weight for the number of the one or more digital website accounts, wherein each of the first weight, the second weight, and the third weight is different from each other; and
   after subsequently determining, based on the monitoring, that the plurality of digital accounts associated with the consumer has decreased, decrease the value associated the cyber-security risk associated with the consumer.

15. The non-transitory computer-readable storage medium of claim 14, wherein the first weight for the number of the one or more digital financial accounts is higher than the third weight for the number of the one or more digital website accounts.

* * * * *